(12) United States Patent
Green

(10) Patent No.: US 11,306,494 B1
(45) Date of Patent: Apr. 19, 2022

(54) STRING GROOVE MASONRY CLAMP WITH ADJUSTABLE JAW

(71) Applicant: Andy Green, Ozark, MO (US)

(72) Inventor: Andy Green, Ozark, MO (US)

( * ) Notice: Subject to any disclaimer, the term of this patent is extended or adjusted under 35 U.S.C. 154(b) by 267 days.

(21) Appl. No.: 16/579,101

(22) Filed: Sep. 23, 2019

Related U.S. Application Data

(63) Continuation-in-part of application No. 15/827,469, filed on Nov. 30, 2017, now Pat. No. 10,458,132, which is a continuation-in-part of application No. 14/963,592, filed on Dec. 9, 2015, now abandoned.

(60) Provisional application No. 62/734,336, filed on Sep. 21, 2018.

(51) Int. Cl.
*E04G 21/18* (2006.01)
*F16B 2/10* (2006.01)

(52) U.S. Cl.
CPC ............ *E04G 21/1825* (2013.01); *F16B 2/10* (2013.01)

(58) Field of Classification Search
CPC . E04G 21/18; E04G 21/1808; E04G 21/1816; E04G 21/1825; E04G 21/1833; B25B 1/24; B25B 1/241; B25B 3/00; B25B 5/16
See application file for complete search history.

(56) References Cited

U.S. PATENT DOCUMENTS

| | | | |
|---|---|---|---|
| 2,519,652 A | 8/1950 | Hargrave | 24/253 |
| 2,667,678 A | 2/1954 | Hargrave et al. | 24/253 |
| 7,007,937 B2 * | 3/2006 | Foshag | B25B 5/068 269/6 |
| D594,726 S * | 6/2009 | Arredondo | D8/72 |
| 8,672,305 B2 | 3/2014 | Wolf et al. | 267/141.2 |

* cited by examiner

*Primary Examiner* — Tyrone V Hall, Jr.
(74) *Attorney, Agent, or Firm* — Keisling & Pieper PLC; David B. Pieper; Trent C. Keisling

(57) ABSTRACT

A string groove masonry clamp having a clamp body with first and second clamp sides pivotally connected together and biased to clamp onto a masonry block to align a string positioning guide having a string groove at the edge of the apex of the corner of the block and an adjustable opposing jaw.

7 Claims, 20 Drawing Sheets

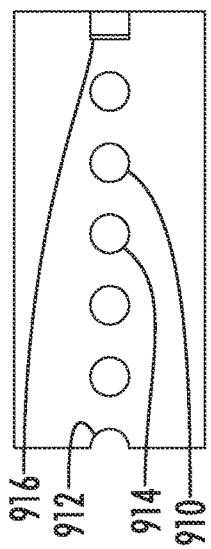
FIG. 25
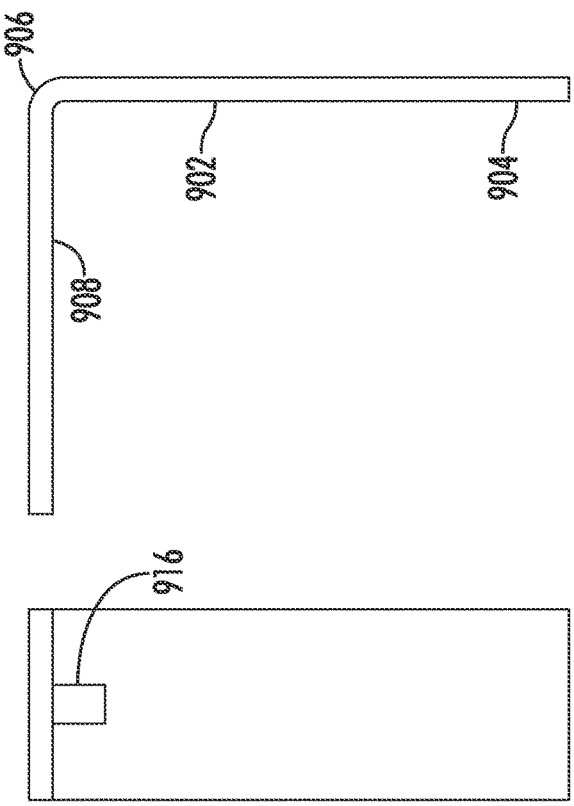
FIG. 29
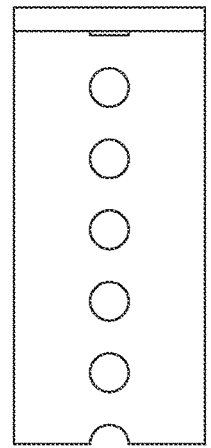
FIG. 30
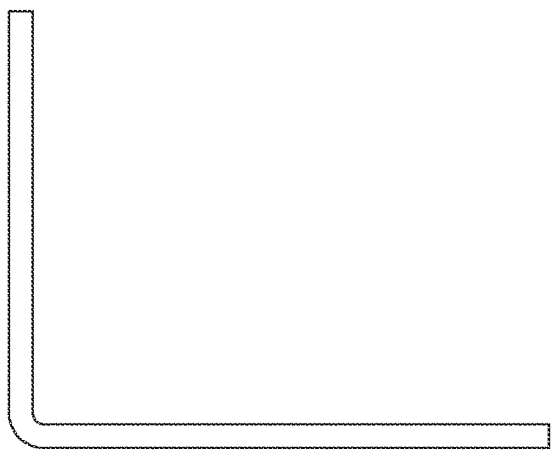
FIG. 28
FIG. 27
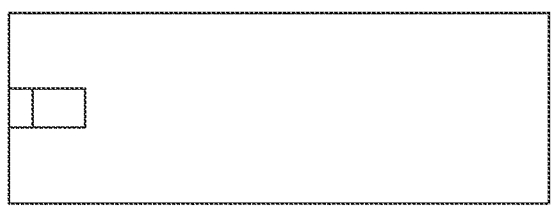
FIG. 26

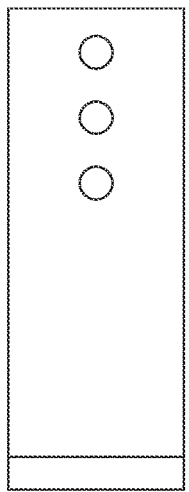
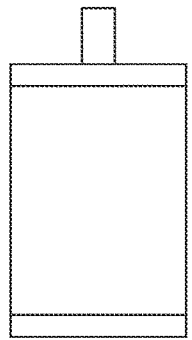
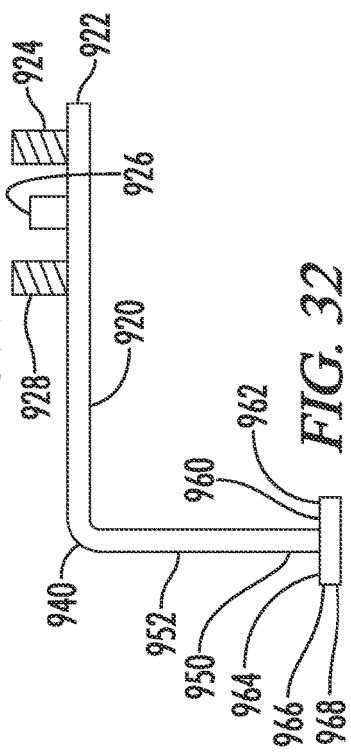
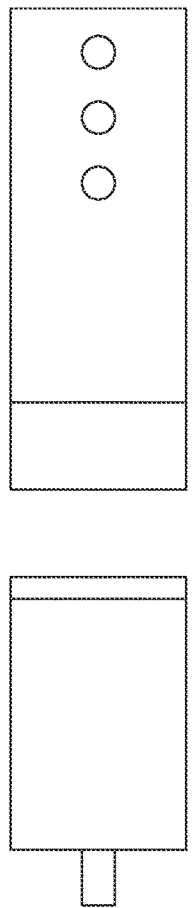
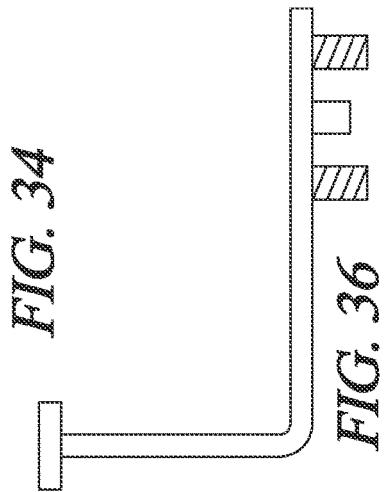

968

STRING GROOVE MASONRY CLAMP WITH ADJUSTABLE JAW

CROSS-REFERENCE TO RELATED APPLICATIONS

This application claims priority as a continuation-in-part of U.S. Utility application Ser. No. 15/827,469 filed on Nov. 30, 2017 by Green entitled String Groove Masonry Clamp which claims priority as a continuation in part of U.S. Utility application Ser. No. 14/963,592 filed on Dec. 9, 2015 by Green entitled String Groove Masonry Clamp; also this application claims priority as a continuation-in-part of U.S. Provisional Application Ser. No. 62/734,336 filed on Sep. 21, 2018 by Green entitled String Groove Masonry Clamp with Adjustable Jaw. Each of these prior applications is incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in spring clamps. More particularly, the invention relates to improvements particularly suited for holding a guide string or level line when building with varying sizes of brick or block and mortar. In particular, the present invention relates specifically to a spring clamp with a string groove positioned adjacent the corner apex of a block and an adjustable opposing clamp jaw.

2. Description of the Known Art

As will be appreciated by those skilled in the art, hand clamps are known in various forms. Patents disclosing information relevant to hand clamps include: U.S. Pat. No. 2,519,652, issued to Hargrave on Aug. 22, 1950 entitled Clamping Device; U.S. Pat. No. 2,667,678, issued to Hargrave on Feb. 2, 1954 entitled Hand Clamp; and U.S. Pat. No. 8,672,307, issued to Pacheo et al. on Mar. 18, 2014 entitled Stretch liner clamp. Each of these patents is hereby expressly incorporated by reference in their entirety.

These prior art clamps fail to precisely locate a masonry string adjacent to the apex of the corner of the block. Thus, it may be seen that these prior art patents are very limited in their teaching and utilization, and an improved string groove masonry clamp is needed to overcome these limitations.

SUMMARY OF THE INVENTION

The present invention is directed to an improved string clamp for placing a string on a masonry block and an adjustable jaw for varying sizes of blocks. The present invention provides a string groove for consistently placing a masonry string in the exact same position every time the clamp and string are positioned on a new layer of block. The present invention protects the string by holding it in a groove to minimize frictional wear and pinch failure of the string associated with the prior art. The present invention also includes an adjustable jaw for varying block sizes.

The invention teaches a string groove masonry clamp for clamping a string using a two sided clamp body with a string positioning guide having a guide body defining a string groove. The guide body can include a planar side jaw defining the string groove. The guide body can include a planar end jaw defining the string groove. The guide body can include both a planar side jaw defining a string groove and planar end jaw defining a string groove. The clamp can also have a string cleat made from a large washer adjacent to a spacer connected to the clamp by a rivet. The clamp can be made as a biasing clamp using an axial coil spring with extending ends contacting the opposing sides of the clamp. The invention also teaches an adjustable clamp jaw.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 25 is a front view of a base body.

FIG. 26 is top view of a base body.

FIG. 27 is a left side view of a base body.

FIG. 28 is aa bottom view of a base body.

FIG. 29 is a left side view of a base body.

FIG. 30 is a back view of a base body.

FIG. 31 is a back view of an adjustment arm.

FIG. 32 is right side view of an adjustment arm.

FIG. 33 is a top view of an adjustment arm.

FIG. 34 is a front view of an adjustment arm.

FIG. 35 is a bottom view of an adjustment arm.

FIG. 36 is a left side view of an adjustment arm.

DETAILED DESCRIPTION OF THE INVENTION

Figure 1:
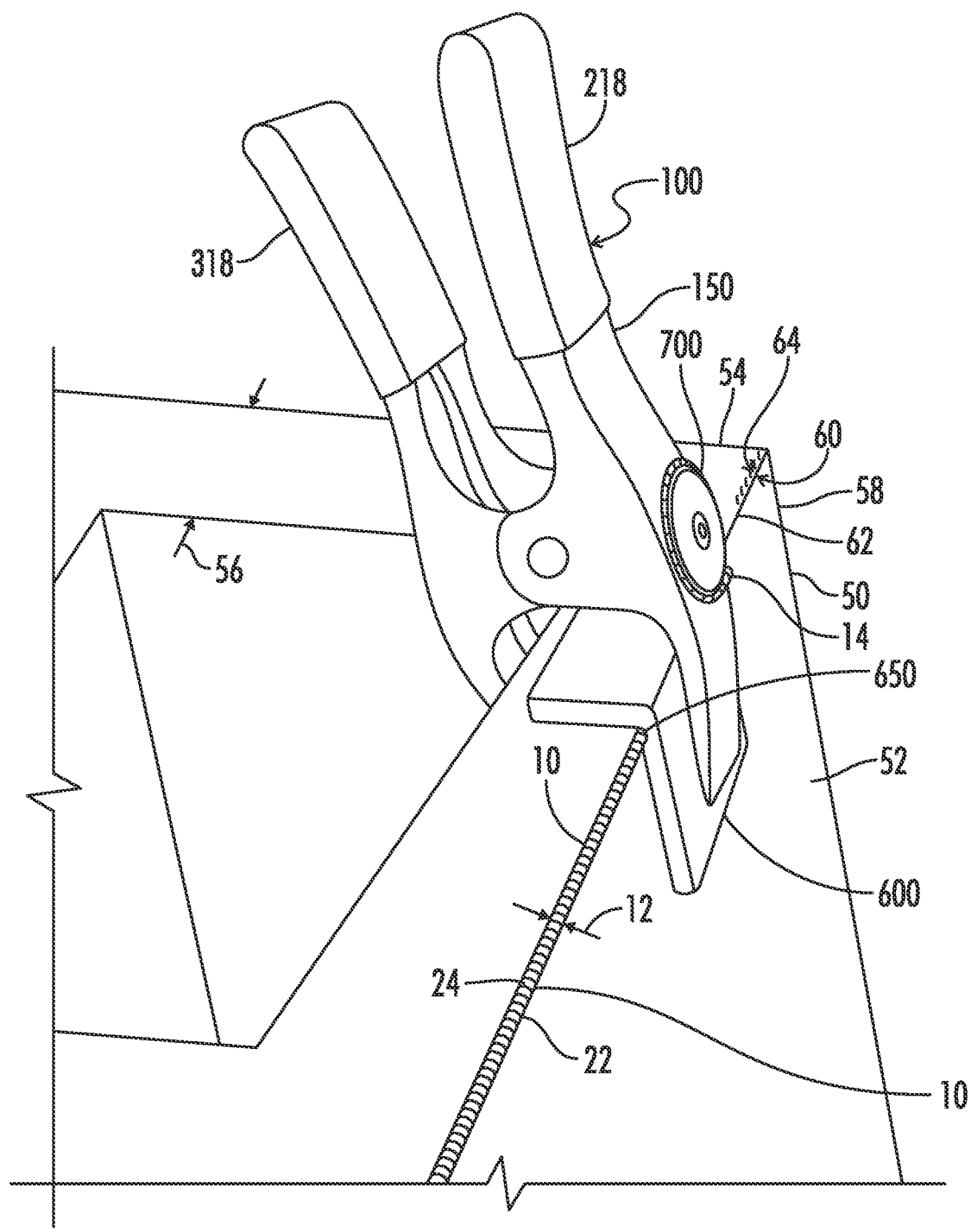
FIG. 1 is an environmental view of a string groove clamp holding a string in a top edge position on a block.
Figure 2:
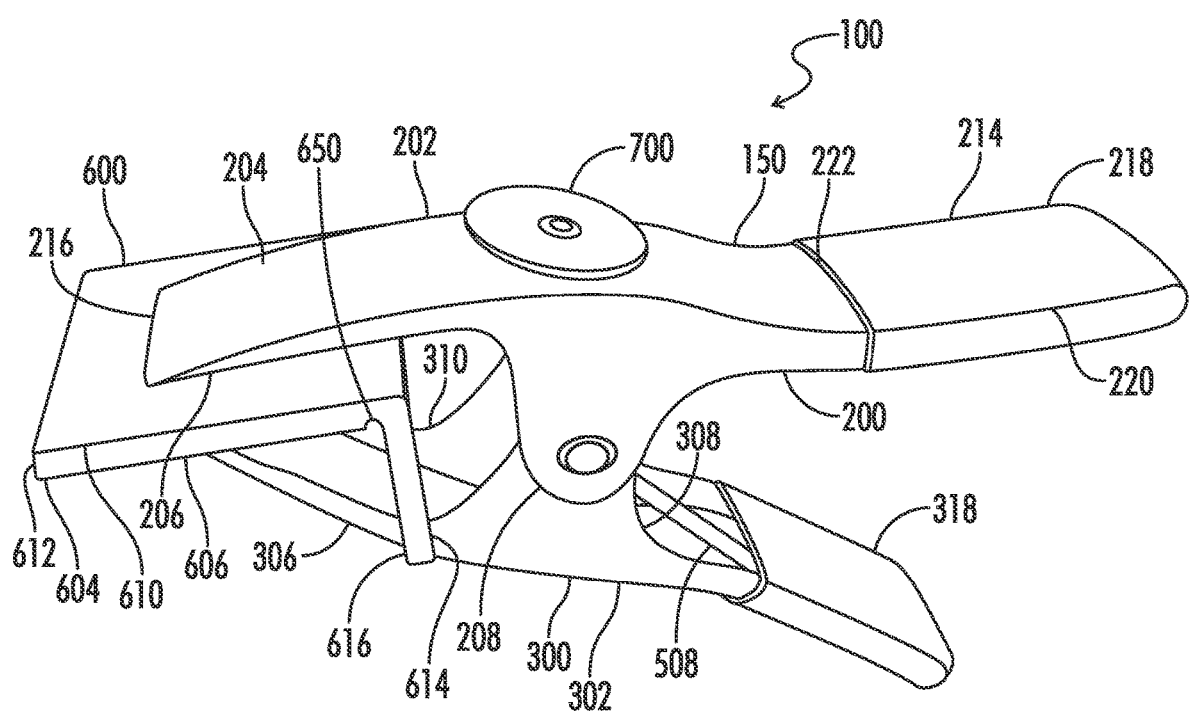
FIG. 2 is a top perspective view thereof.
Figure 3:
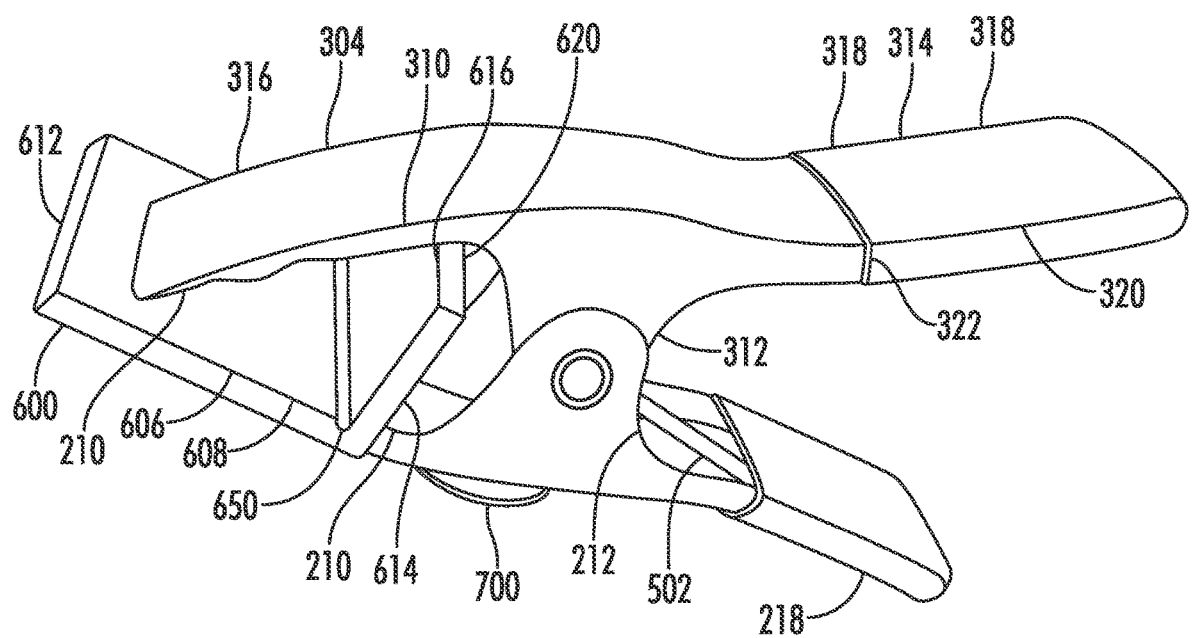
FIG. 3 is a bottom perspective view thereof.
Figure 4:
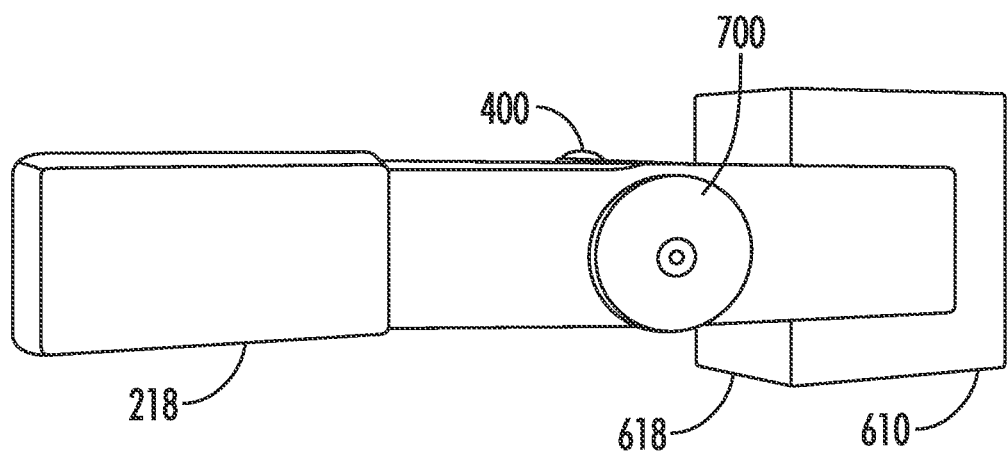
FIG. 4 is a top view thereof.
Figure 5:
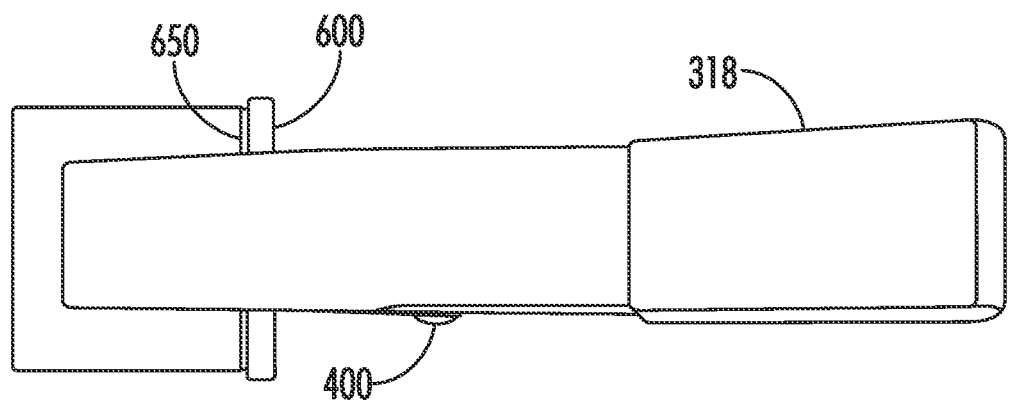
FIG. 5 is a bottom view thereof.
Figure 6:
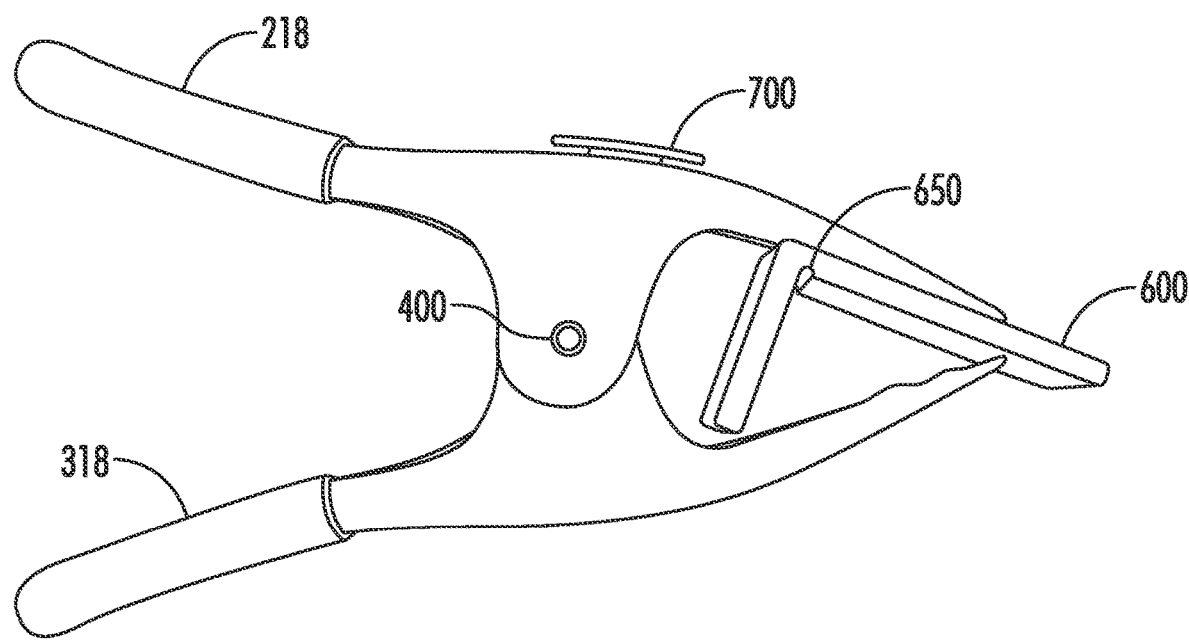
FIG. 6 is a left view thereof.
Figure 7:
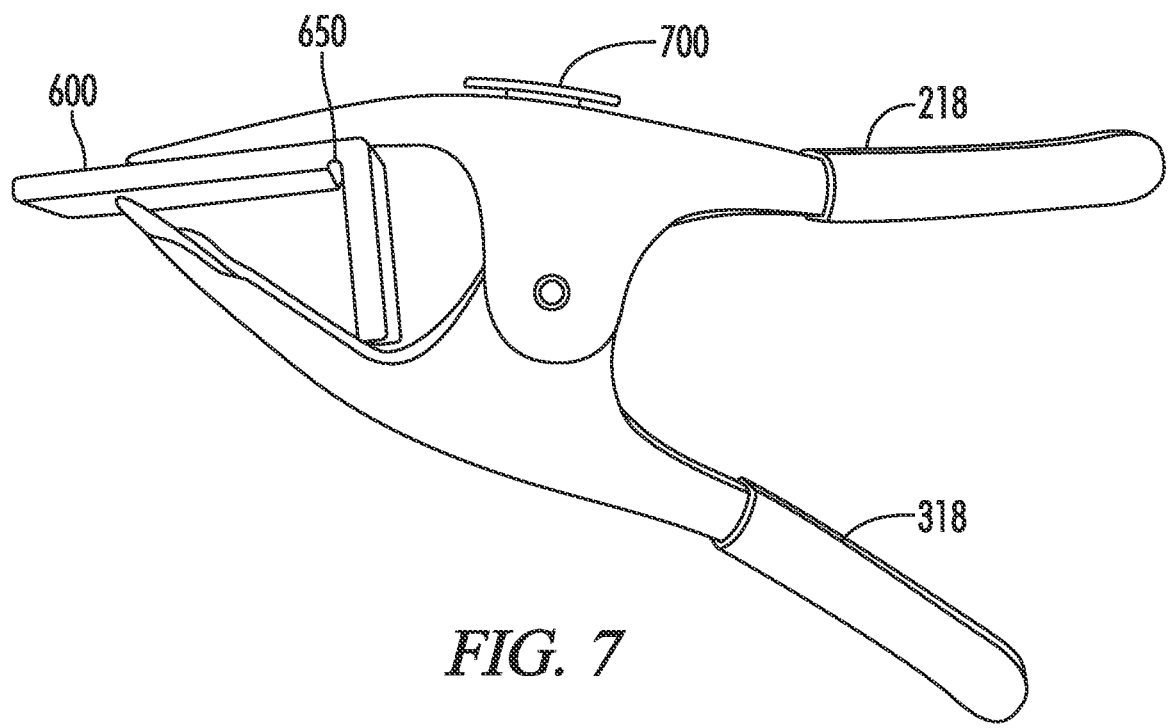
FIG. 7 is a right view thereof.
Figure 8:
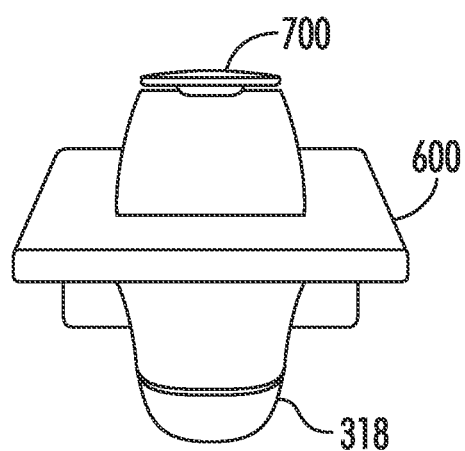
FIG. 8 is a front view thereof.
Figure 9:
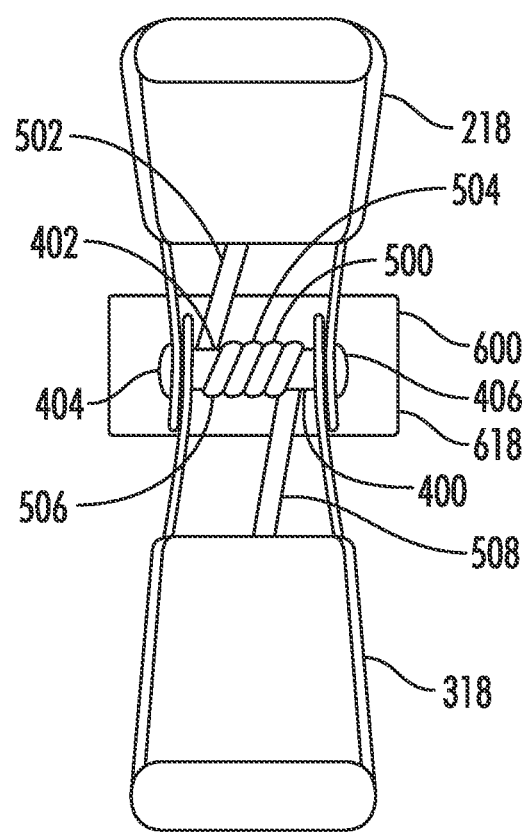
FIG. 9 is a back view thereof.
Figure 10:
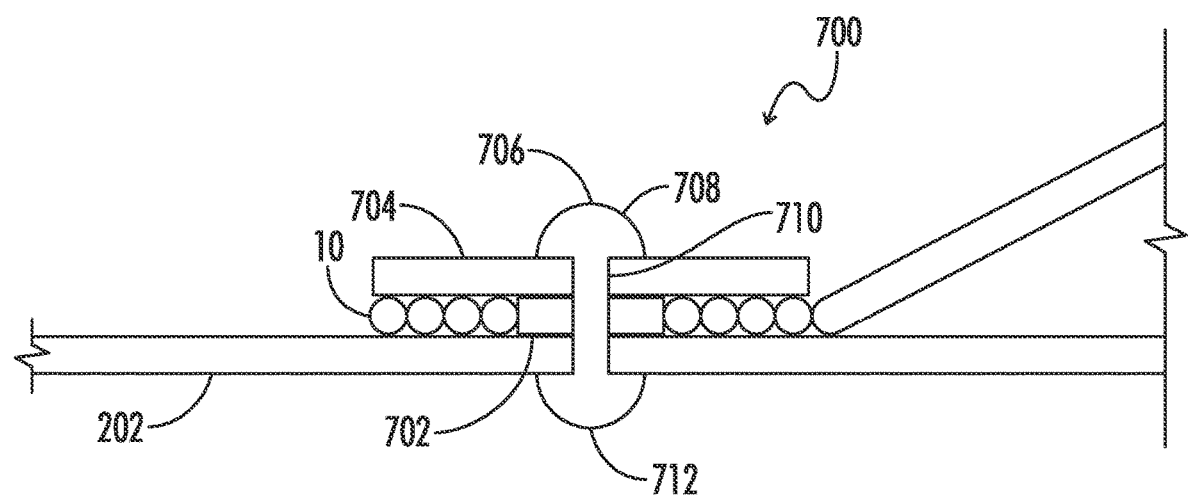
FIG. 10 is a schematic view of the string cleat.
Figure 11:
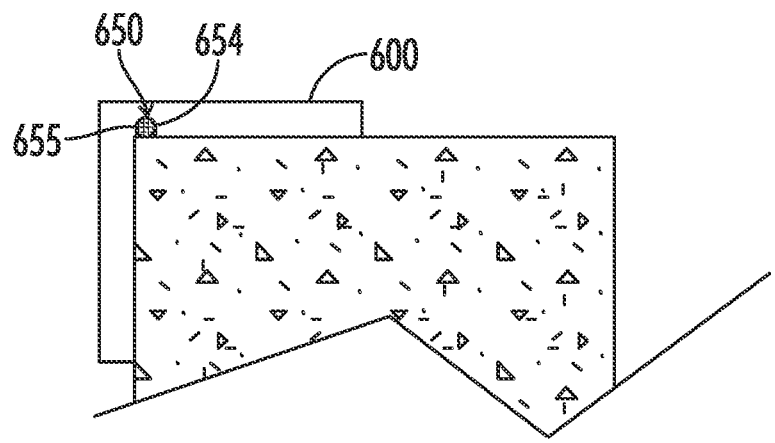
FIG. 11 is a schematic view of the top and side positioning of a string on a block.
Figure 12:
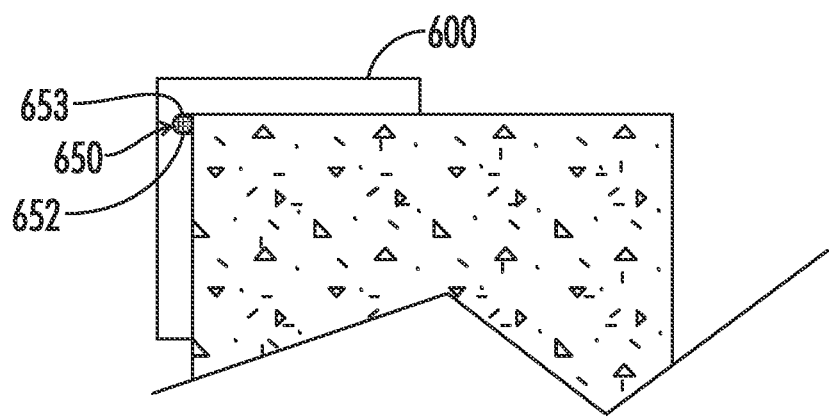
FIG. 12 is a schematic view of the side positioning of a string on a block.
Figure 13:
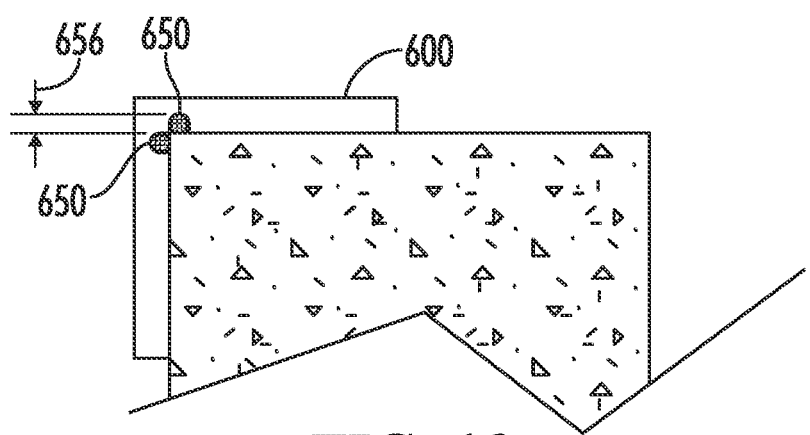
FIG. 13 is a schematic view of the top and side positioning of a string on a block.
Figure 14:
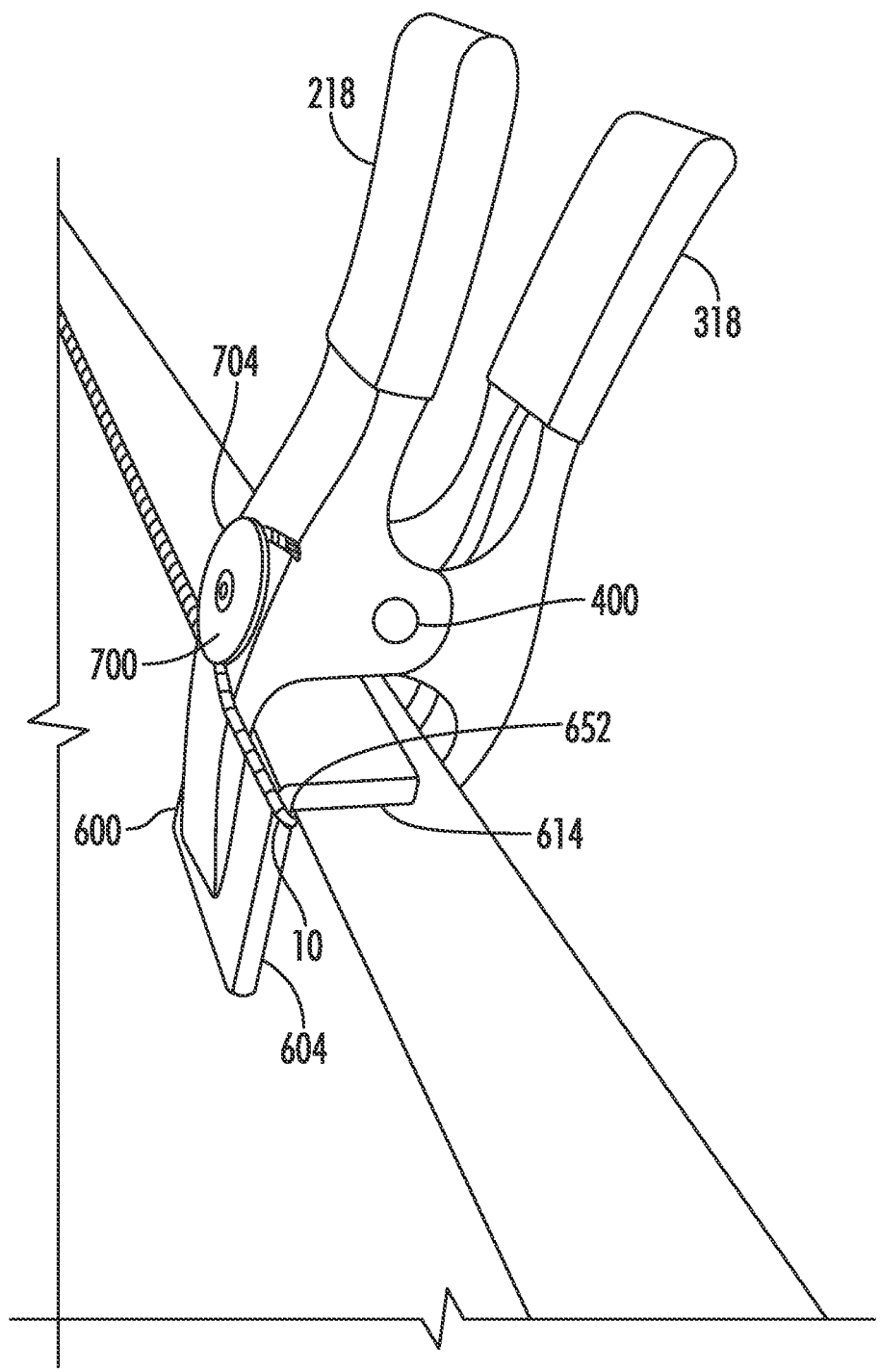
FIG. 14 is an environmental view showing the string groove clamp holding a string.
Figure 15:
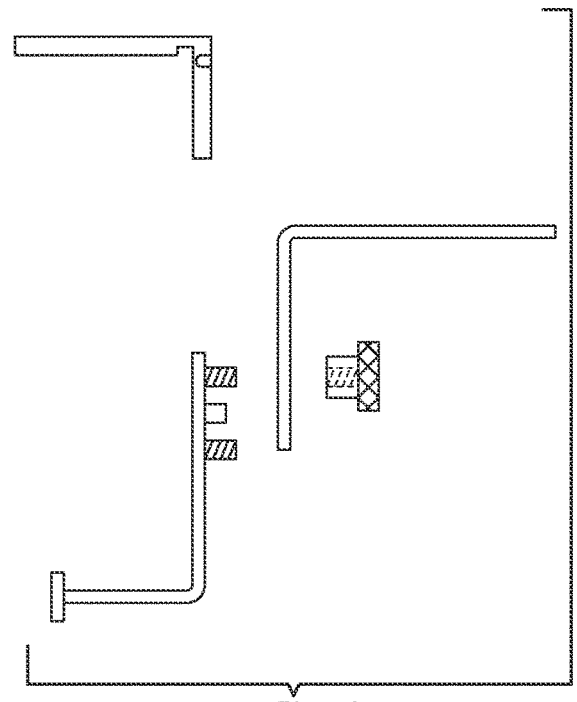
FIG. 15 is an exploded view of an adjustable jaw frame opposite an apex edge string positioning guide with a side string groove.
Figure 16:
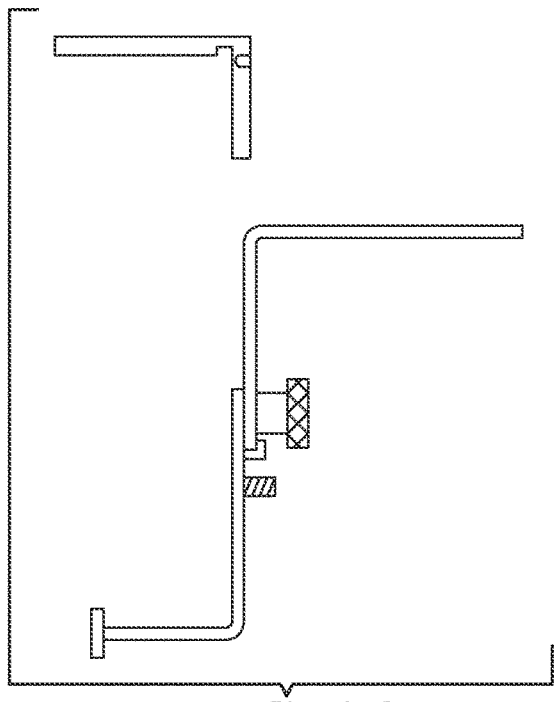
FIG. 16 shows an assembled view of the adjustable jaw frame opposite an apex edge string positioning guide with a side string groove.
Figure 17:
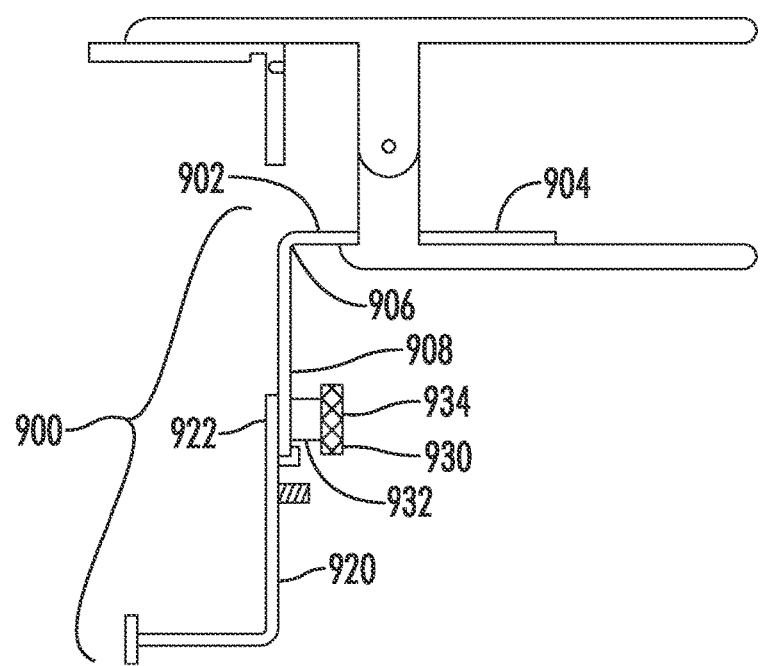
FIG. 17 shows the assembled view of the adjustable jaw frame opposite an apex edge string positioning guide with a side string groove mounted on the opposing clamp sides.
Figure 22:
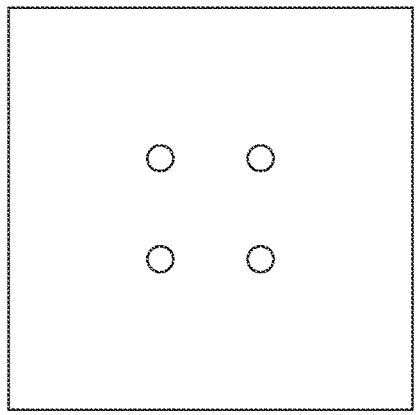
FIG. 22 is a top view of an apex edge string positioning guide with a side string groove.
Figure 21:
FIG. 21 is a back view of an apex edge string positioning guide with a side string groove.
Figure 18:
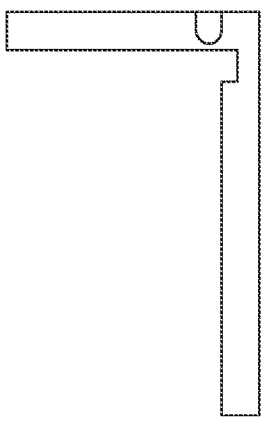
FIG. 18 is a right side view of an apex edge string positioning guide with a side string groove.
Figure 20:
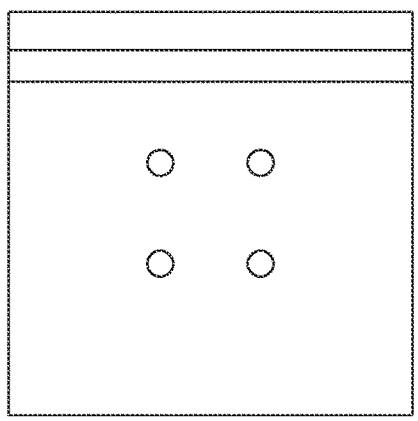
FIG. 20 is a bottom view of an apex edge string positioning guide with a side string groove.
Figure 23:
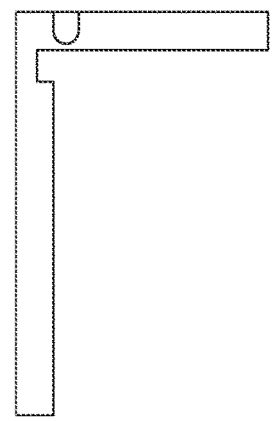
FIG. 23 is a left side view of an apex edge string positioning guide with a side string groove.
Figure 19:
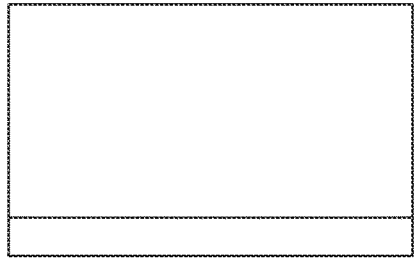
FIG. 19 is a front view of an apex edge string positioning guide with a side string groove.
Figure 24:
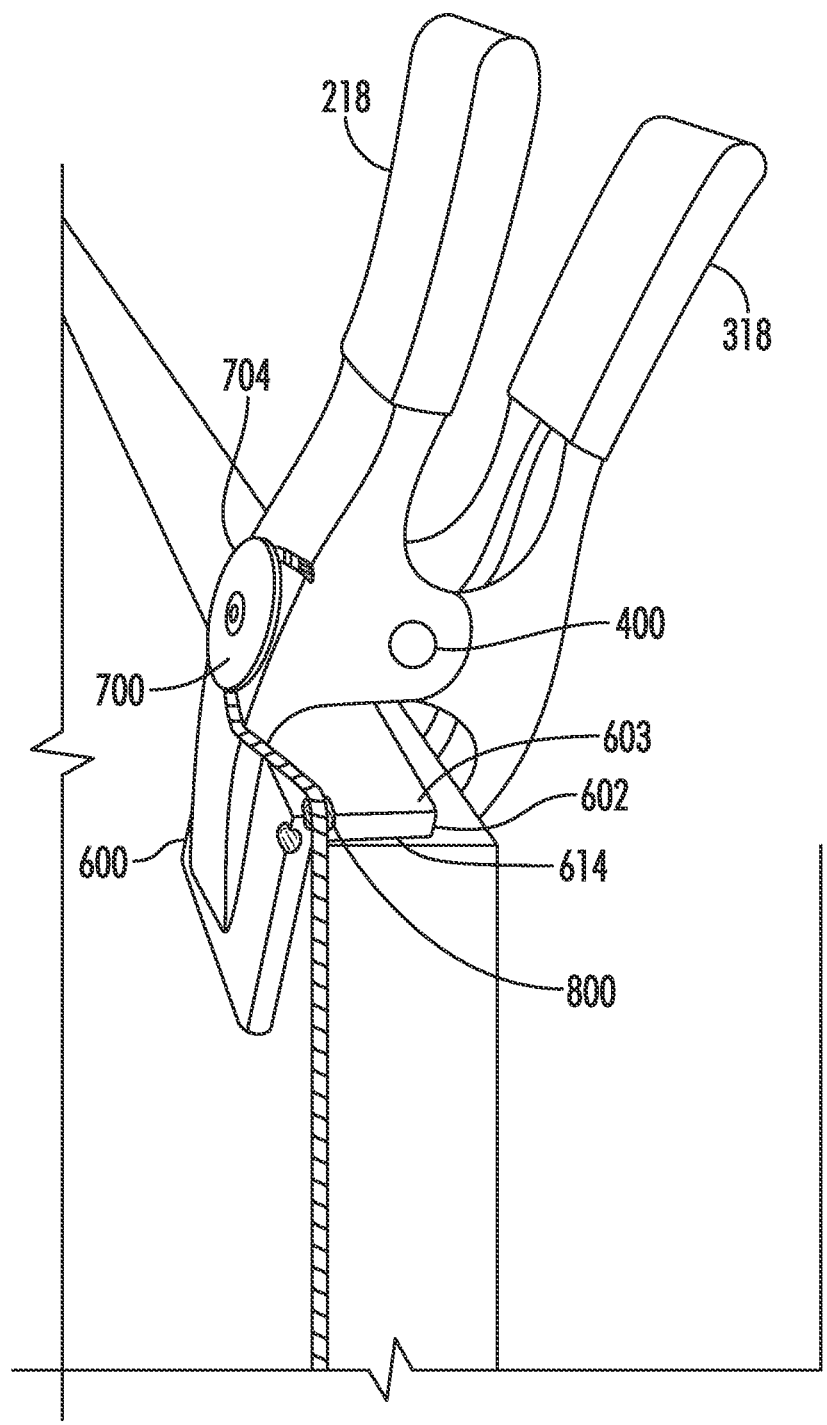
FIG. 24 is an environmental view showing the side string groove holding a string.
Figure 39:
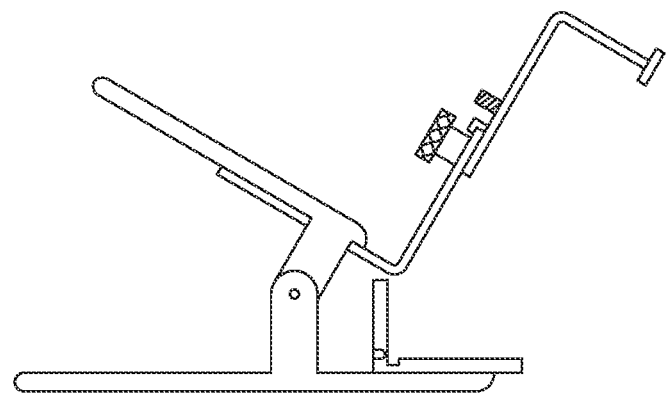
FIG. 39 is a side view of an adjustment arm in a wide position on a closed clamp.
Figure 38:
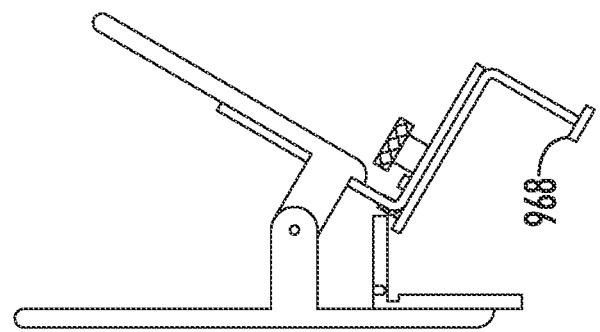
FIG. 38 is a side view of an adjustment arm in a mid position on a closed clamp.
Figure 37:
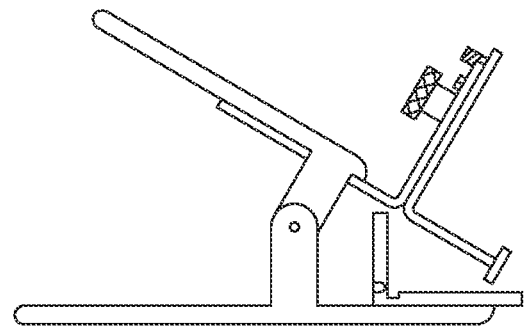
FIG. 37 is a side view of an adjustment arm in a narrow position on a closed clamp.
Figure 42:
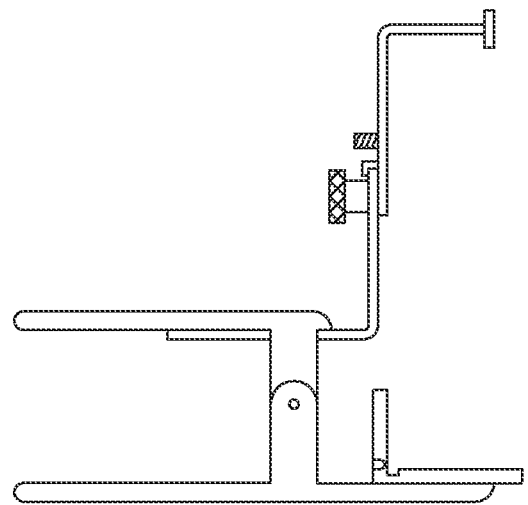
FIG. 42 is a side view of an adjustment arm in a wide position on a mid open clamp.
Figure 41:
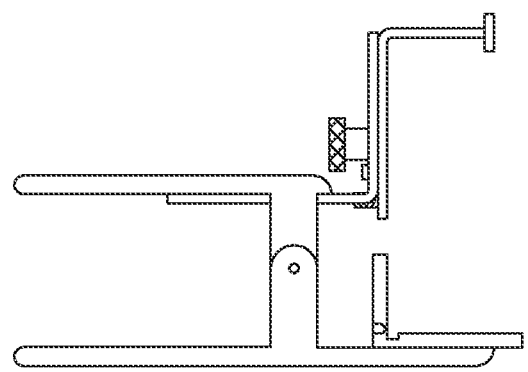
FIG. 41 is a side view of an adjustment arm in a mid position on a mid open clamp.
Figure 40:
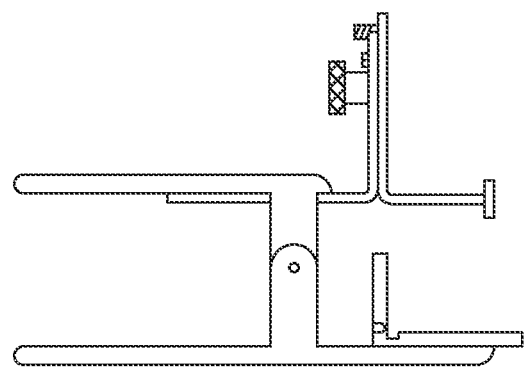
FIG. 40 is a side view of an adjustment arm in a narrow position on a mid open clamp.
Figure 45:
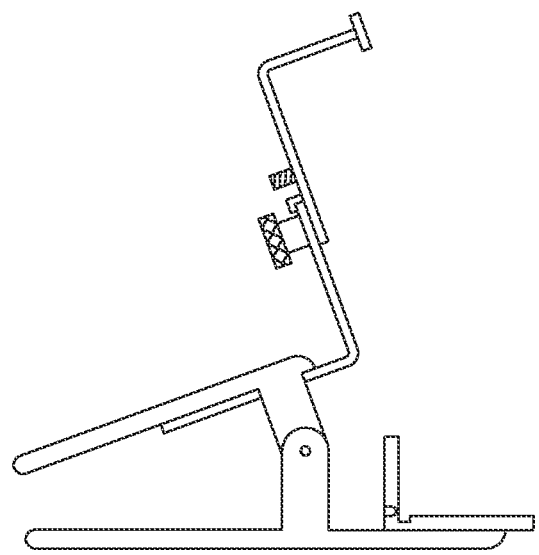
FIG. 45 is a side view of an adjustment arm in a wide position on a full open clamp.
Figure 44:
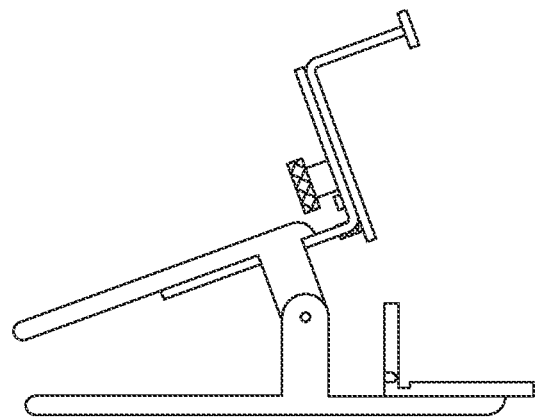
FIG. 44 is a side view of an adjustment arm in a mid position on a full open clamp.
Figure 43:
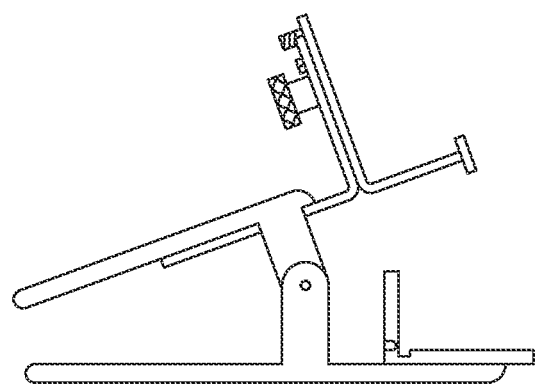
FIG. 43 is a side view of an adjustment arm in a narrow position on a full open clamp.

As shown in FIG. 1 through 45 of the drawings, an exemplary embodiment of the present invention is generally shown as a string groove masonry clamp 100. The string groove masonry clamp 100 is made with a clamp body 150 having a first clamp side 200 and a second clamp side 300 joined by a pivoting axle 400 and biased to clamp with a biasing spring 500. The clamp body also has an apex edge string positioning guide 600 for aligning a string 10 with an apex edge and a string cleat 700 for frictionally engaging the string diameter 12 of a string 10.

The first clamp side 200 includes a first clamp body 202 having a jaw back 204 connected to a first jaw side 206 defining a first outer pivot arm 208 and a second jaw side 210 defining a second outer pivot arm 212. The first clamp body 202 also includes a first handle 214 for moving the first clamp jaw 216. The first handle 214 is covered with a first handle sleeve 218 having a user gripable outer surface 220 and an aperture end 222 slid onto the first handle 214.

The second clamp side 300 includes a second clamp body 302 having a jaw back 304 connected to a second jaw side 306 defining a first inner pivot arm 308 and a second jaw side 310 defining a second inner pivot arm 312. The second clamp body 302 also includes a second handle 314 for moving the second clamp jaw 316. The second handle 314 is covered with a second handle sleeve 318 having a user gripable outer surface 320 and an aperture end 322 slid onto the second handle 314.

The first clamp side 200 is pivotally connected to the second clamp side by an axle 400. The axle 400 includes an axle body 402 terminating in a first axle end 404 and a second axle end 406 that are swaged out to form a head to moveably secure the clamp sides 200 and 300 together. A biasing spring 500 is provided to bias the clamp 100 closed with a first leg 502 contacting the first clamp side 200, an axial coil 504 defining a coil aperture 506 surrounding the axle 400, and a second leg 508 biasing the second clamp side 300.

At least one side of the clamp 100 includes an apex edge aligning string positioning guide 600 with a guide body 602 including both a planar side jaw 604 and a planar end jaw 614 that align with the block to find the apex 62 of the corner 60 of the block 50. The planar side jaw 604 includes a side edge face 606 defining the thickness of the side jaw 604 and an inner side contact face 608 for contacting the side 52 of the block 50. The outer side clamp face 610 connects to the first clamp side 200 or second clamp side 300 as appropriate. The front edge face 612 also defines the thickness of the side jaw 604. The end jaw 614 includes an inner end contact face 616 for contacting the edge 54 or top 54 of the block 50 and an outer end clamp face 618, along with an end edge face 620 defining the thickness of the end jaw 614. Either or both of the side jaw 604 and/or the end jaw 614 include an apex aligned string groove 650. The string groove 650 is either a block face string groove 652 with a face apex aligned edge wall 653 or a block top string groove 654 with a top apex aligned edge wall 655. Note how this protects the string 10 and perfectly positions the string 10 at the apex edge 64 and aligns the edge diameter 12 of the string 10 with the side 52 or top 54 of the block 50 as appropriate. Thus, if the string 10 is positioned on top 54 of the block 50, then the string side 22 is aligned with the block side 52. Similarly, if the string 10 is positioned on the side 52 of the block, then the top 24 of the string 10 is aligned with the top 54 of the block 50. String grooves 650 define a string groove depth 656 matching with the string diameter 12 to protect the string 10 and hold the string 10 in position. The string 10 is secured by passing out of the end of the string groove 650 and wrapping the end 14 of the string 10 around a string cleat 700. The string cleat 700 is made using a gap washer 702 and top washer 704 secured with a holding rivet 706. The holding rivet 706 has a rivet body 710 extending from an outer rivet end 708 to an inner rivet end 712.

As shown in FIGS. 17-24 and 37-45 the guide body 602 can also include a side string groove 800 cut into the back 603 of the guide body 602 to allow the string to be hold in position on the outside of the guide body 602 with or without using the apex aligned string groove 650.

As shown in FIGS. 15-23, and 25-45, the second clamp jaw 316 includes an adjustable jaw frame 900 and an adjustment arm 920. The adjustable jaw frame 900 includes a base body 902 with a handle end 904, perpendicular mid bend 906, and adjustment end 908. The handle end 904 is secured to the opposite side of the clamp body from the guide body 602. The adjustment end 908 defines adjustment apertures 910 including a partial end aperture 912, mid body apertures 914, and an elongated bend aperture 916.

The adjustment arm 920 is selectively positioned on the adjustable jaw frame 900. The adjustment arm 920 includes a base end 922, perpendicular mid bend 940, and contact end 950. The base end 922 has a first threaded extension 924, middle positioned extension pin 926, and a second threaded extension 928. A finger nut 930 with a threaded body 932 and a knurled grip 934 is threaded onto either the first threaded extension 924 or second threaded extension 928 to selectively mount the adjustment arm 920 to the adjustable jaw frame 900. The contact end 950 includes an end arm 952 terminating in an extending contact head 960. The extending contact head 960 has a base extension ear 962 and an outward extension ear 964 extending in opposite directions so that the adjustment arm 920 can work in opposing one hundred and eighty degree rotated positions. Each ear 962, 964 ends in a contact tip 966 with an angled face 968 so that the contact tip 966 and planar end jaw 614 provide a secure clamping action.

Reference numerals used throughout the detailed description and the drawings correspond to the following elements:

String 10
String diameter 12
String end 14
String side 22
String top 24
Block 50
Block side 52
Block top 54
Block edge thickness 56
Block end 58
Block corner 60
Corner apex 62
Apex edge 64
String groove masonry clamp 100
Clamp body 150
First clamp side 200
First Clamp body 202
Jaw back 204
First jaw side 206
First outer pivot arm 208
Second jaw side 210
Second outer pivot arm 212
First handle 214
First clamp jaw 216
First handle sleeve 218
Outer surface 220
Aperture end 222
Second clamp side 300
Second Clamp body 302
Jaw back 304
First jaw side 306
First inner pivot arm 308
Second jaw side 310
Second inner pivot arm 312
Second handle 314
Second clamp jaw 316
Second handle sleeve 318
Outer surface 320
Aperture end 322
Axle 400
Axle body 402
First axle end 404
Second axle end 406
Biasing spring 500
First leg 502
Axial coil 504
Coil aperture 506
Second leg 508
Apex edge string positioning guide 600
Guide body 602
Planar side jaw 604

-continued

Side edge face 606
Inner side contact face 608
Outer side clamp face 610
Front edge face 612
Planar end jaw 614
Inner end contact face 616
Outer end clamp face 618
End edge face 620
Apex edge string groove 650
Block face string groove 652
Face apex aligned edge wall 653
Block top string groove 654
Top apex aligned edge wall 655
String groove depth 656
String cleat 700
Gap spacer washer 702
Top washer 704
Holding rivet 706
Outer rivet end 708
Rivet body 710
Inner rivet end 712
Side string groove 800
Adjustable jaw frame 900
Base body 902
   Handle end 904
   Perpendicular Mid bend 906
   adjustment end 908
      Adjustment apertures 910
         Partial end aperture 912
         Mid body aperture 914
         Bend aperture 916
Adjustment arm 920
   Base end 922
      First threaded extension 924
      Extension pin 926
      Second threaded extension 928
      Finger nut 930
         Threaded body 932
         Knurled grip 934
Perpendicular Mid bend 940
Contact end 950
   End arm 952
      Extending contact head 960
         Base extension ear 962
         Outward extension ear 964
            Contact tip 966
               Angled face 968

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A string groove masonry clamp apparatus for clamping a string, comprising:
   a clamp body;
   the clamp body including a first clamp side;
   the clamp body including a second clamp side pivotally connected to the first clamp side;
   a guide body connected to the first clamp side; and
   an adjustable jaw frame including a base body and an adjustment arm connected to the second clamp side; and
   the guide body including an inner end contact face and an inner side contact face, the side contact face including a front edge face positioned distally beyond the second clamp side, and the inner end contact face defining a block top string groove.

2. The apparatus of claim 1, further comprising:
   the guide body including a planar side jaw.

3. The apparatus of claim 2, further comprising:
   the planar side jaw defining the string groove.

4. The apparatus of claim 1, further comprising:
   the guide body including a planar end jaw.

5. The apparatus of claim 4, further comprising:
   the planar end jaw defining the string groove.

6. The apparatus of claim 1, further comprising:
   the guide body including back defining a side string groove.

7. The apparatus of claim 1, further comprising:
   wherein the inner side contact face has a side width, the inner end contact face has an end width equal to the side width, and the inner side contact face defines a block side string groove.

* * * * *